April 19, 1932.  A. W. DAY  1,854,455
PISTON
Filed Nov. 23, 1928  2 Sheets-Sheet 1

Inventor
Austin W. Day,
By
Attorneys

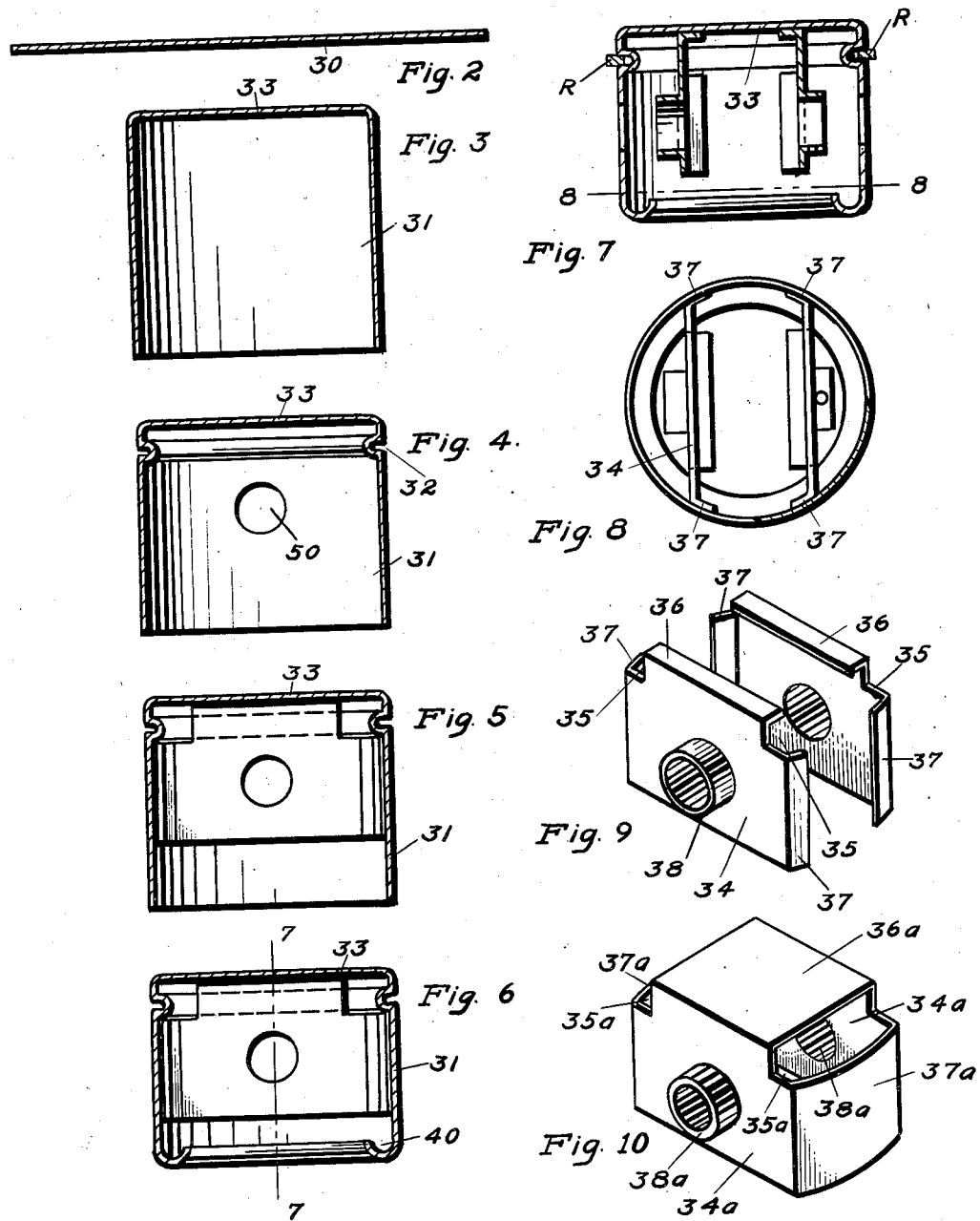

Patented Apr. 19, 1932

1,854,455

UNITED STATES PATENT OFFICE

AUSTIN WESLEY DAY, OF SLAYTON, MINNESOTA

PISTON

Application filed November 23, 1928. Serial No. 321,428.

This invention relates to improvements in engine pistons and particularly to a method of producing such pistons, and the piston so produced.

It has heretofore been proposed to provide engines with oil cooling systems, whereby a jet of oil was projected against the inner surfaces of the piston to maintain it at an operating temperature. It has also been proposed to manufacture pistons for engines, as for example internal combustion engines, of castings, of sheet metal, and of combinations of the two.

The present invention relates to a piston and a method of producing the same from sheet metal, and proposes a simple, cheap and expedient method to this end. In particular, the piston so produced is advantageously adapted for employment with an oil cooling system of the type set forth above.

According to the present invention, a piston is assembled from a cup which has been made from sheet metal by cutting and punching or pressing operations and other well known methods of handling sheet material, whereby a cheap, light and strong assemblage is produced.

The invention has been illustratively shown on the accompanying drawings, in which:

Figs. 2, 3, 4, 5 and 6 represent the successive steps in the formation of a piston according to the present process.

Fig. 7 is a sectional view corresponding to that of Fig. 6, and substantially on line 7—7 thereof.

Fig. 8 is a horizontal sectional view of the piston according to Figs. 6 and 7, substantially on line 8—8 of Fig. 7.

Fig. 9 is a perspective view showing a pair of struts as employed in the pistons of Figs. 5 to 8.

Fig. 10 is a similar perspective view of a modified form of strut.

Figure 1:
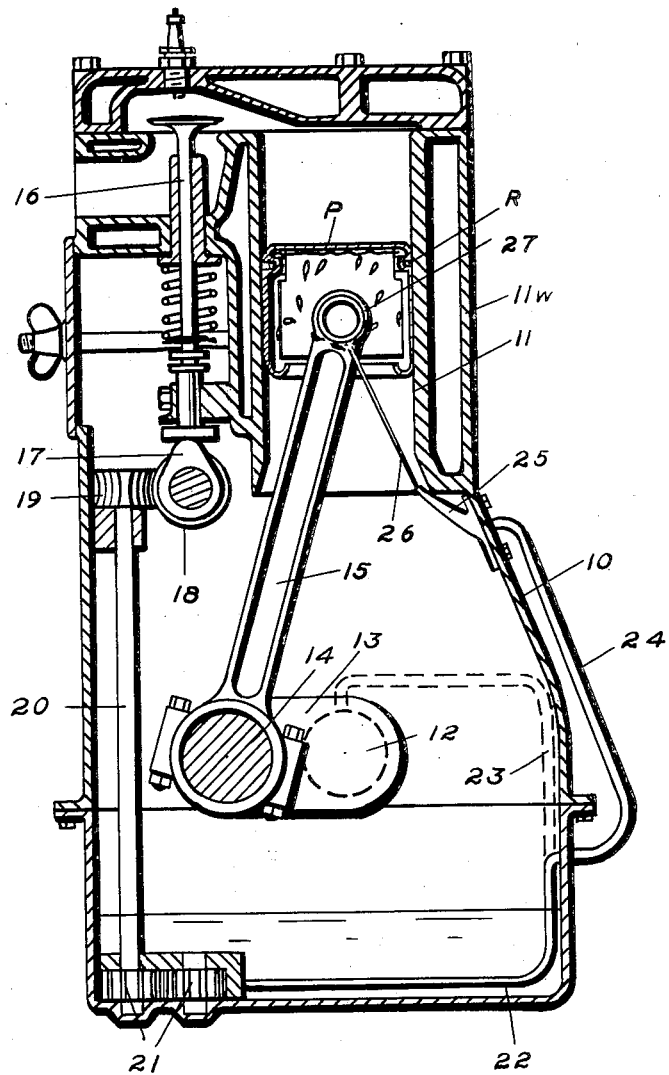
Figure 1 is a vertical sectional view through an internal combustion engine employing one of the new pistons, this section being taken at a right angle to the crank shaft and diametrically through the cylinder.

In these drawings, the internal combustion engine is represented as having a crank case 10, cylinder walls 11 with water jacket 11w, a main shaft 12 and crank 13 with pin 14 to receive the connecting rod 15. The usual valves 16 with valve rod and cam 17 are provided to effect the operation of the engine in the required cycle. A worm 18 on the cam shaft 17 drives a worm wheel 19 on a pump shaft 20 whereby is operated the gear pump 21 which takes lubricating oil from the base of the crank case 10 and delivers it through a pressure pipe 22 and individual conduits 23 for lubricating the various moving parts. A further conduit 24 branches from the pipe 22 and terminates in a nozzle 25 which is directed upwardly and inwardly at the lower edge of the cylinder wall 11, so that a jet of lubricating oil 26 is projected into the interior of this cylinder and thus comes into contact with the inner surface of the piston P and with the wrist pin bearing 27 of the connecting rod 15, whereby to lubricate the wrist pin bearing and to cool the piston P. The oil thus discharged into the piston P falls freely by gravity back into the sump at the bottom of the crank casing 10, and may lubricate the crank pin bearings 14 on its way.

The method of manufacture of a piston such as that shown in Fig. 2 is represented in Figs. 2 to 6 according to the successive steps employed. A sheet metal blank 30 is cut to circular form and of the desired size, for example by a blanking operation in a power press. This blank is then drawn into a cup 31 (Fig. 3) by one or more stages and accompanied by annealing, as may be necessitated by the material and size.

It is preferred during this drawing operation to reduce the thickness of the metal at the free edge of the skirt of the cup. The cup 31 is then mounted over a mandrel and operated upon by a rolling tool whereby a groove 32 is turned into its periphery adjacent the top 33, this groove having substantially parallel walls at a right angle to the axis of the piston (Fig. 4).

Stiffening strut members are then placed within the piston and secured rigidly thereto by welding to the head 33 and to the skirt 31, and thus hold the head against vibrational and other undesired relative movement under the pressures existing in the engine, and likewise stiffen and support the skirt against distortion.

Suitable strut assemblies for this purpose are shown in Figs. 9 and 10. In Fig. 9, each strut member has a plane portion 34 which extends chordally across the interior of the piston as shown in Fig. 8, when assembled therewith. The upper corners of this plane are cut away to leave the notches 35 whereby the strut fits around the inwardly rolled wall of the ring groove 32. The top edge of the strut is bent over to form a right angled flange 36. The ends 37 of the strut are likewise bent to form flanges which are curved to the proper shape and angle to adapt them closely to the inner surfaces of the skirt 31 (Fig. 8). These flanges are joined to the head and skirt by the welding operation. These strut members also serve as supports for the wrist pin 27, and for that purpose are formed with outwardly projecting bearing sleeves 38 which are preferably formed by forcing the metal of the plate 34 itself into the proper shape. It will be noted that the plate 34 with its flanges 36, 37 and the sleeve 38 may be cut to shape and formed by simple operations in a punch press: and that the respective members of Fig. 9 are symmetrical and identical, so that but one shape and size of strut is required for a given type of piston.

In Fig. 10, the strut assembly is shown as formed integrally in one piece, with the opposite plane walls 34a which are joined at the top by the plane cross member 36a. The arcuate lateral connecting walls 37a are formed as before to closely fit the inner surfaces of the skirt 31 of the piston. As before, portions 35a are cut away to permit the top plane surface 36a of the strut to rest against and be secured to the head 33 of the piston. The bearing sleeves 38a may be formed integrally with the respective walls 34a, or may be made separately and welded rigidly to these walls: the wrist pins need only be of a length to fill these bearings. It will be noted that the strut of Fig. 10, again, may be basically formed from sheet metal by simple cutting and pressing operations.

After the struts of Figs. 9 or 10 have been assembled in the skirt 31 and to the head 33, as by welding in the manner set forth above, the lower edge of the skirt 31 is turned inward to form a trough 40, for example by a simple spinning operation on the lathe, or by curling with pressing dies. As pointed out above, it is preferred to have this edge of the skirt 31 reduced in thickness, thus assuring substantial strength with greater lightness.

The piston is now completed, and may now be hardened by carburizing and then corrected in shape and diameter by a simple grinding operation. Since, however, the various operations have been accomplished to true metal guides, it will be observed that the parts may be made very closely to dimensions, and that very little grinding is necessary for the correction of distortion or inaccuracy of size. It is, for example, possible to prepare the pistons for .001 inch clearance for a three inch piston.

It is preferred to accomplish the joining of the struts to the skirt by electrical arc or spot welding. The joining of the upper flanges 36 or 36a to the head 33 of the piston involves no distortion which is injurious to the shape or size of the piston itself, while the employment of an inner mandrel and outer die during the welding of the lateral flanges 37 or 37a of the struts to the skirt 31 corrects for any distortion which may occur during such operation.

It is preferred, immediately following the step of groove rolling, (Fig. 4) to punch circular apertures 50 in the piston skirts, and to employ these apertures in aligning the struts during assemblage. These apertures later serve for the insertion and removal of the wrist pin 27 for the respective piston. It will be understood, however, that the formation of this aperture is not essential, since the wrist pin may be inserted in the struts before they in turn are placed within the skirt 31, in which event a permanent assemblage of all parts is obtained.

Since the sheet metal is of uniform size and material, it is apparent that the several operations employed will result in the production of pistons which are accurate in size and weight, to within very small fractions, and further that the weights of the individual pistons will be small. The piston proper is formed of three or two elements, i. e., (1) the head and skirt, (2) a strut assembly of two symmetrical strut members or a single strut member. It may be pointed out that a piston body of this type and 3¼ inches in diameter and about 3¾ inches long, and formed from a 7½ inch blank of one-sixteenth inch sheet steel, weighs about fifteen ounces in a completed condition. The single piston ring for employment in such a piston weighs about one ounce. A hollow wrist pin of a proper size for such a piston in gas engine work weighs about four ounces. Hence the total assembly of piston body, ring and wrist pin is less than twenty ounces, in weight, and hence the inertia forces occurring in the internal combustion engine equipped with such pistons are very much less than with the usual cast iron pistons, and less indeed than with pistons formed of light alloys, while the present piston is of much stronger and surface-hardened material and less subject to defects by blow holes or irregularities than in any cast pistons. The sheet material employed for the piston is preferably selected with due regard to its coefficient of expansion and to the coefficient of expansion of the material employed for the cylinder walls, so that no binding can occur even under excessive overheating of the engine.

In particular, it will be noted that the skirt is without slots or notches therein, and affords a uniform and constant bearing area for the entire periphery of the cylinder wall, thus giving an even oil film and resulting in a lesser oil consumption, and affording the same bearing area as is obtained with the standard cast iron piston.

The heat transmission through the head 33 of the piston is free, and this heat is immediately taken up by the jet of oil 26 acting on the inner surface of the piston and on the strut assembly, so that the interior of the piston remains cool at all times. This heat transfer also occurs through the piston ring R to the wall of the groove 32, and likewise is taken up by the oil from jet 26.

By reason of the permitted close fitting of the piston walls to the cylinder walls, it is found that a single ring is sufficient to establish a proper sealing of the explosion space, whereby the heretofore great friction between the plurality of resilient rings upon the cylinder walls is avoided, and therewith the great wear thus occasioned.

It is obvious that the invention is not limited to the forms of execution represented, but that it may be employed in many ways within the scope of the appended claims.

What I claim as new and desire to secure by Letters Patent is:

1. In a piston for an expansible chamber engine, a head and a skirt forming an integral closed cylindrical sheet metal cup of the full diameter of the piston for substantially the entire length of the skirt, the metal of the cup being curved at the junction of the head and skirt and depressed inwardly adjacent the said junction to provide an internal rib and a single external ring groove, a strut assembly located within the cup and fitting said skirt close to said depressed portion and extending along the inner cylindrical wall of said skirt and having portions curved to conform to said wall and secured thereto, said assembly also having portions secured to said head, and wrist pin bearings formed on said strut assembly intermediate the points of attachment thereof to said wall and being free of connection to said skirt.

2. In a piston for an expansible chamber engine, a head and a skirt forming an integral closed cylindrical sheet metal cup of the full diameter of the piston for substantially the entire length of the skirt, the metal of the cup being curved at the junction of the head and skirt and depressed inwardly adjacent the said junction to provide an internal rib and a single external ring groove, a strut assembly located within the cup and comprising an end wall conforming to said head and a pair of side walls conforming to said skirt and a pair of connecting walls joining said end and side walls, and wrist pin bearings formed on said connecting walls, said rib being located in gaps between said end and side walls, said end and side walls being secured to the head and cylindrical wall of the skirt closely adjacent said rib.

In testimony whereof I affix my signature.
AUSTIN WESLEY DAY.